Figure 1:
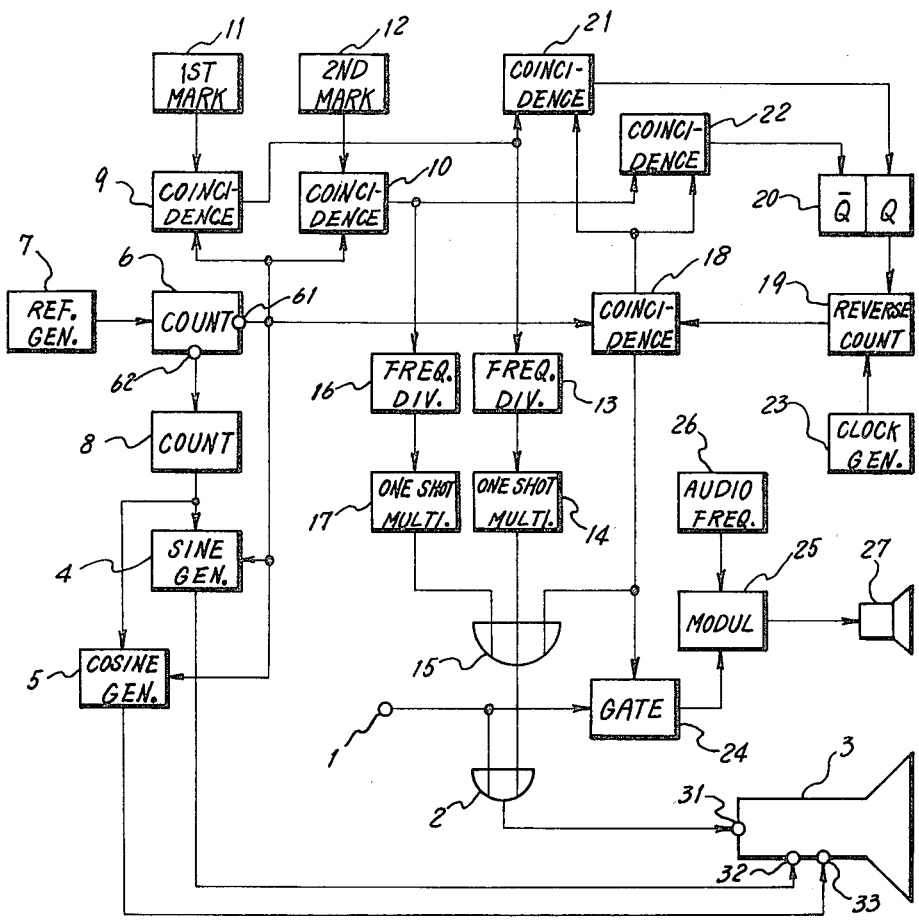

United States Patent [19]

Iida et al.

[11] 4,057,779
[45] Nov. 8, 1977

[54] ULTRASONIC DETECTION SYSTEM

[75] Inventors: Masajiro Iida; Hideharu Morimatsu, both of Takarazuka; Itsuo Fukuoka; Yoshinari Yoshida, both of Nishinomiya, all of Japan

[73] Assignee: Furuno Electric Company, Limited, Japan

[21] Appl. No.: 654,476

[22] Filed: Feb. 2, 1976

[30] Foreign Application Priority Data

Feb. 18, 1975 Japan .................................. 50-20595

[51] Int. Cl.² ............................................. G01S 7/62
[52] U.S. Cl. .................................................... 340/3 C
[58] Field of Search ........................................ 340/3 C

[56] References Cited

U.S. PATENT DOCUMENTS 3,723,953  3/1973  Scheer ................................ 340/3 C
3,889,225  6/1975  McKenzie et al. .................. 340/3 C Primary Examiner—Richard A. Farley
Attorney, Agent, or Firm—Eugene E. Geoffrey, Jr.

[57] ABSTRACT

A scanning sonar system for detecting objects and displaying them on a circular screen and producing audible signals coordinated with the visual signals indicating the detection of an object.

7 Claims, 2 Drawing Figures

ULTRASONIC DETECTION SYSTEM

This invention relates to an ultrasonic detection system and more particularly to a so-called scanning sonar.

In a scanning sonar, a train of ultrasonic wave pulses are emitted in all peripheral directions and the reflected waves coming back from the respective directions are received by a receiving device having rotating directivity and indicated on a cathode ray tube screen scanned circularly. In such a scanning sonar, it is well known to audibly indicate the reflected wave in addition to providing a visible indication. However, prior audible indicators have been inconvenient for concentrated detection in a specific range of direction due to the lack of cooperation with the visible indication.

Accordingly, an object of this invention is to provide an improved scanning sonnar system which provides both visible and audible indications interlocked to facilitate coordination. More particularly, the object of this invention is to provide a scanning sonar in which a radial bright line marker moves in a reciprocating manner within a predetermined range of direction on the cathode ray tube screen and, at the same time, an audible signal is produced at each time the bright line marker displays the reflecting object.

This object can be attained by the ultrasonic detection system according to this invention, which comprises means for emitting a train of ultrasonic wave pulses in all peripheral directions, means for receiving said ultrasonic wave pulses reflected back from the respective directions by means of rotating directivity and producing a reception signal and means for indicating said reception signal on a cathode ray tube screen scanned circularly in synchronism with the emitted ultrasonic wave pulses. As a feature of this invention, the system further comprises means for generating a train of low frequency pulses, a reversible counter circuit for counting said low frequency pulses, means for inverting said counter circuit at two different counts of said counter circuit, means for indicating a radial bright line on said cathode ray tube screen in response to each count output of said counter circuit and means for sampling said signal in response to each count output and producing an audible signal in response to said sampled received signal, thereby simulating a radial bright line to be reciprocated between two directions corresponding to said two different counts of said reversible counter circuit and, at the same time, signalling the presence of the reception signal in the direction of said bright line in audible fashion.

Other objects and features of this invention will be described in more detail hereinunder with reference to the accompanying drawings.

Figure 2:
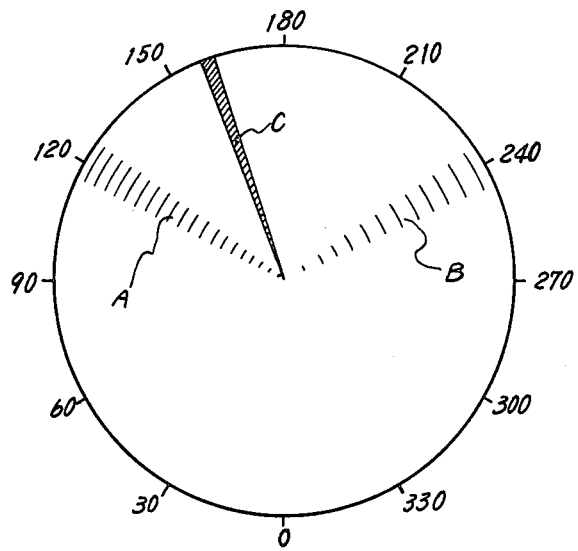

In the drawings:

FIG. 1 is a schematic circuit diagram representing, in block form, an embodiment of the ultrasonic detecting system according to this invention; and FIG. 2 is a schematic diagram representing an image displayed on the cathode ray tube screen of the system shown in FIG. 1.

Referring to FIG. 1, an input terminal 1, which is to be connected to a receiving ultrasonic transducer 63, is connected to one input of an OR circuit 2 whose output is connected to the luminance terminal 31 of a cathode ray tube 3. The horizontal and vertical deflection electrode terminals 32 and 33 of the cathode ray tube 3, are interconnected with the outputs of a sine wave generator 4 and a cosine wave generator 5, respectively. A normal count output 61 of a counter circuit 6 which is supplied with a train of clock pulses from a reference clock pulse generator 7 is directly connected to the control inputs of the sine wave and cosine wave generators 4 and 5 and another particular output terminal 62 thereof is connected through another counter circuit 8 to the modulation inputs of the generators 4 and 5.

The normal output 61 of the counter circuit 6 is also connected to one set of inputs of two coincidence circuits 9 and 10 while a second set of inputs are respectively supplied from first and second marker setting units 11 and 12. The coincidence output of the coincidence circuit 9 is connected through a frequency divider circuit 13 and a one-shot multivibrator circuit 14 to an OR circuit 15, and the coincidence output of the coincidence circuit 10 is connected through another frequency divider circuit 16 and another one-shot multivibrator circuit 17 to the same OR circuit 15. The output of the OR circuit 15 is connected to a second input of the OR circuit 2.

The normal output 61 of the counter circuit 6 is further connected to an input of a coincidence circuit 18 the other input of which is supplied from a reversible counter circuit 19. The coincidence output of the coincidence circuit 18 is connected to one set of inputs of two coincidence circuits 21 and 22, the other input of each circuit being supplied from the outputs of the coincidence circuits 9 and 10, and the coincidence outputs of the coincidence circuits 21 and 22 are further connected respectively to the "set" and "reset" terminals Q and $\overline{Q}$ of a flip-flop circuit 20 having an output connected to the control terminal of the reversible counter circuit 19. A low frequency clock pulse generator 23 is connected to the input terminal of the counter circuit 19.

The coincidence output of the coincidence circuit 18 is also connected to a third input of the OR circuit 15 and the control terminal of a gate circuit 24. The input terminal 1 of the system is also connected through the gate circuit 24 and a modulator circuit 25 to an audible signal generator 27 such as loud speaker. An audio frequency generator 26 is connected to the modulation input of the modulator 25.

Now, the operation of the system of FIG. 1 will be described with reference to the Figures.

The counter circuit 6 counts clock pulses of relatively high frequency, which are supplied from the reference clock pulse generator 7 and produces a count output successively in coded form from the terminal 61. This count output is successively applied to the sine and cosine wave generators 4 and 5 and the generators 4 and 5 produce respectively sine and cosine wave voltage outputs based upon their coded inputs. As these voltage outputs are respectively applied to the horizontal and vertical deflection electrodes of the cathode ray tube 3, its electron beam forms a circular scan line on its display screen.

The counter circuit 6 also produces at the terminal 62 one pulse at the end of every count corresponding to one cycle of the sine and cosine waves or one round of the circular scan, and, at the same time, it is reset to zero count. If the system is arranged to complete each circular scan for 360 periods of the clock pulses, for example, the counter circuit 6 produces at the terminal 62 a train of pulses having a same frequency as the circular scan and, therefore, the counter 8 tends to count the rounds of circular scan. As the count output of the counter circuit 8 is applied to the generators 4 and 5 to modulate the amplitudes of the sine and cosine waves concurrently, the circular scan line on the display screen increases successively its diameter at the end of every round until the counter circuit 8 is reset to zero count at the end of every predetermined count.

A reception signal corresponding to the ultrasonic wave signal reflected back to the receiving ultrasonic transducer (not shown) is supplied from the terminal 1 through the OR circuit 2 to the luminance terminal 31 of the cathode ray tube 3 and is indicated as a bright image in the circular scanning raster on the display screen. As the above mentioned method of forming a circularly scanned image is well known in this field, no further description will be provided. However, it should be noted that the frequency of the reference clock pulses from the generator 7 is preferably selected as an integral multiple of the frequency of the ultrasonic wave pulses emitted from the cooperating ultrasonic transmitter 64 and the output frequency of counter 8 is often selected as equal to the frequency of the emitted ultrasonic wave pulses so as to obtain one-to-one correspondence between the emitted pulse and the circular scan line.

The count output of the counter circuit 6 is also applied to the coincidence circuits 9 and 10 and compared with the outputs of the first and second marker setting units 11 and 12, respectively. The marker setting units 11 and 12 are similar in structure, including a direction input device such as key board or selection switch and a digital encoding device and produce two different direction outputs in coded form. When coincidence is obtained between the both inputs, the coincidence circuits 9 and 10 produce coincidence pulses, respectively, which are applied through the respective frequency divider circuits 13 and 16 and one-shot multivibrator circuits 14 and 17 and the common OR circuits 15 and 2 to the luminance terminal 31 of the cathode ray tube 3.

As the coincidence circuits 9 and 10 both sense coincidence once during each circular scan, they produce similar trains of coincidence pulses having same frequency and which is equal to the line frequency of the circular scan. However, the frequency divider circuits 13 and 16 have different frequency dividing ratios, and, accordingly, produce two outputs having different frequencies. The output pulses of the frequency divider circuits 13 and 16 are similarly shaped respectively by the one-shot multivibrators 14 and 17 into pulses having extremely small duration. The outputs of the one-shot multivibrators 14 and 17 are indicated on the cathode ray tube 3 as shown by symbols A and B, respectively, in FIG. 2. The indicated markers A and B are each composed of a number of small segments of the scan lines arranged radially at a specific interval. Due to the difference in frequency of the outputs of the frequency divider circuits 13 and 16, both markers A and B differ only in the above interval. The main object of providing such interval difference between the both markers A and B is to distinguish easily the starting point and the end point of the detection range which are previously set in the first and second marker setting units 11 and 12, respectively.

In the example of FIG. 2, the detection range is designated between two angular directions, 120° and 240°, and the system is arranged to have each circular scan corresponding to 360 counts of clock pulses. Both angular directions, 120° and 240°, are respectively fed to the marker setting units 11 and 12 and derived therefrom as coded outputs representing numerical values 120 and 240. Accordingly, the coincidence circuits 9 and 10 produce outputs every 120 counts and 240 counts of the counter circuit 6 and the markers A and B are indicated in the illustrated positions. In this example, moreover, the frequency dividing ratios of the frequency divider circuits 13 and 16 are selected as $\frac{1}{2}$ and $\frac{1}{3}$, respectively. Therefore, the ratio of the intervals of the scan line segments in the markers A and B is shown about 3:2 in the drawing.

The count output of the counter circuit 6 is also compared with the count output of the reversible counter circuit 19 in the coincidence circuit 18 and the coincidence output of the coincidence circuit 18 is applied through the OR circuits 15 and 2 to the luminance terminal of the cathode ray tube 3 to excite the display screen. As the frequency of the clock pulses counted by the reversible counter circuit 19 is extremely low as compared with the frequency of the clock pulses counted in the counter circuit 6, a radial marker C (FIG. 2) is indicated on the display screen in response to a specific count of the reversible counter circuit 19. Moreover, such marker C is given by every count output of the reversible counter circuit 19, so that the marker C rotates with advance of the count of the counter circuit 19.

In addition, the coincidence output of the coincidence circuit 18 is also applied to the coincidence circuits 21 and 22 in response to every count output of the reversible counter circuit 19 and compared therein with the coincidence outputs of the coincidence circuits 9 and 10, respectively. In this case, the coincidence circuits 21 and 22 operate as AND circuits since both inputs are simple pulses representing "1" or "0", and produce coincidence outputs when the count of the reversible counter circuit 19 coincides with the counts corresponding to the markers A and B, that is, when the rotating marker C comes to the positions of the markers A and B. The coincidence output of the coincidence circuit 21 is applied to the "set" terminal of the flip-flop circuit 20 to turn it to the "high" state and the coincidence output of the coincidence circuit 22 is applied to the "reset" terminal thereof to turn it to the "low" state. Since the reversible counter circuit 19 is arranged to perform "addition" in response to the "high" state of the flip-flop circuit 20 and "subtraction" in response to the "low" state thereof, the "addition" starts at the marker A and ends at the marker B, while the "subtraction" starts at the marker B and ends at the marker A. Consequently, the moving marker C is reciprocated between the markers A and B.

The coincidence output of the coincidence circuit 18 is further applied to the gate circuit 24 to drive it into conduction. If there is any input of the reception signal from the input terminal 1 during conduction of the gate circuit 24, it is supplied through the gate circuit 24 to the audible signal generator 27 after modulated in the modulator circuit 25 with an appropriate audio frequency signal supplied from the audio frequency signal generator 26. Thus, the audible signal generator, such as loud speaker, 27 produces an audible or sound signal which signals the presence of a reflecting object in the direction of the marker C.

What is claimed is:

1. An ultrasonic detection system, comprising means for emitting a train of ultrasonic wave pulses in all peripheral directions, means for receiving said ultrasonic wave pulses reflected back from the respective directions by means of rotating directivity and producing a reception signal and means for indicating said reception signal on a cathode ray tube screen scanner circularly in synchronism with the emitted ultrasonic wave pulses, said system further comprising means for generating a train of low frequency pulses, a reversible counter circuit for counting said low frequency pulses, means for inverting said reversible counter circuit at two different counts of said reversible counter circuit, means for indicating a radial bright line on said screen in response to each count output of said reversible counter circuit, and means for sampling said reception signal in response to each of said count outputs and producing an audible signal in response to said sampled reception signal, whereby a simulated radial bright line is reciprocated between two directions corresponding to said two different counts of said reversible counter circuit and, at the same time, the presence of the reception signal in the direction of said bright line is audibly signalled.

2. The ultrasonic detection system, according to claim 1 wherein said inverting means includes a flip-flop circuit for supplying "high" level and "low" level outputs to said reversible counter circuit, two coincidence circuits for supplying "set" and "reset" inputs respectively to said flip-flop circuit and means connected respectively to one input of each of said coincidence circuits for producing different coded outputs, and the output of said reversible counter circuit is connected through a third coincidence circuit respectively to the other inputs of the first said coincidence circuits.

3. The ultrasonic detection system according to claim 1 wherein said bright line indicating means includes a clock pulse generator for generating clock pulses in synchronism with the circular scan of said cathode ray tube, a counter circuit for counting said clock pulses, a coincidence circuit for comparing the count output of said counter circuit with the count output of said reversible counter circuit to produce a coincidence output, and means for indicating said coincidence output on said cathode ray tube screen.

4. The ultrasonic detection system according to claim 1 wherein said reception signal sampling means includes a gate circuit having said reception signal as its input and controlled by said coincidence output, and said audible signal producing means includes an audio frequency generator, a modulator for modulating the output of said audio frequency generator with the output of said gate circuit and means for converting the output of said modulator into sound.

5. The ultrasonic detection system according to claim 3 wherein said reception signal sampling means includes a gate circuit having said reception signal as its input and controlled by said coincidence output, and said audible signal producing means includes an audio frequency generator, a modulator for modulating the output of said audio frequency generator with the output of said gate circuit and means for converting the output of said modulator into sound.

6. The ultrasonic detection system according to claim 2 wherein said system further includes a clock pulse generator for generating clock pulses in synchronism with the circular scan of said cathode ray tube, a counter circuit for counting said clock pulses, a pair of coincidence circuits for comparing the count output of said counter circuit with marker setting inputs to produce coincidence pulses respectively, and means for indicating said coincidence pulses respectively on said cathode ray tube screen.

7. The ultrasonic detection system, according to claim 6 wherein said coincidence pulse indicating means includes a pair of frequency divider circuits having different dividing ratios for frequency-dividing said coincidence pulses, respectively.

* * * * *